Racing [illegible]
2

CLASS [illegible]
7724-X
DIVISION.

W. & T. SCHNEBLY 8-22-1833

Cutting Grain, Grapes

Patented 22nd Aug 1833

A. Frame

B. Crosspieces

C. Perpendicular Shaft

D. Shears

E. Receiving plane or Sheet moving upon Rollers

F. Reel

G. Guard board

H. Cap or Head block

K. Lever handles giving motion to Shears

L. Front Roller

M. Cog segment

N. Horizontal Shaft

O. Pulley on "D" & strap connected with Pulley Q

P. Spur wheel on "D"

Q. Pulley on Rollers which move Receiving Plane

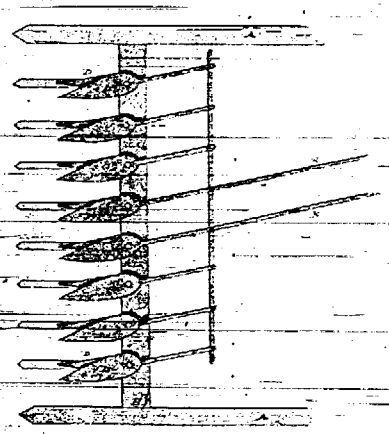

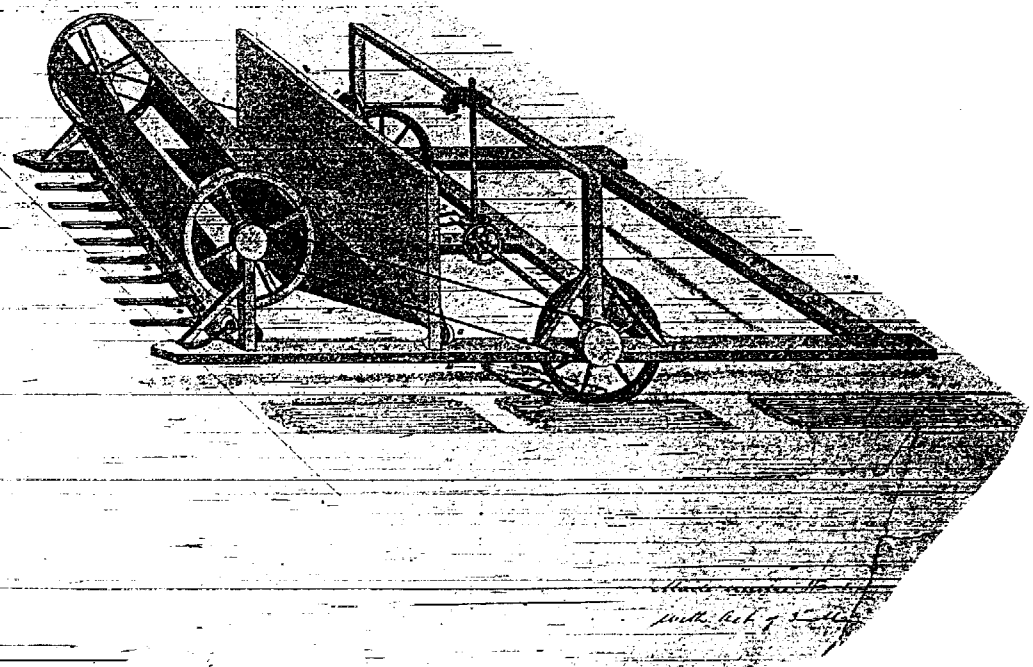

Made under the [illegible]
with Act of [illegible]

G. Strickland Del.

77244

Aug 22 1833

William Schnebly & Thos. Schnebly
of Hagerstown, State of Maryland.

Letters Patent.

Aug. 22, 1833

The Schedule referred to in these Letters patent and making part of the same containing a description in the words of the said William Schnebly and Thomas Schnebly themselves of their improvement for cutting grain grass.

To all to whom these presents shall come
Be it known that we William Schnebly and Thomas Schnebly of Hagerstown in the County of Washington and State of Maryland, have invented a new and useful improvement in cutting grain, seeds, & grass, and that the following is a full and exact description of the construction, and operation of said machine as invented by us - and titled the reel and shear grain cutter -

This machine is to be made of suitable materials of the following dimensions. The frame or ground work to be from ten to twelve feet in length, and from three to nine feet in breadth connected together by cross pieces, one, twenty two inches in rear of the front ends, one, four feet six inches in rear of the first, one, two feet six inches in rear of the second, and one at the extreme end of the frame, from the second to the third likewise a cross piece as a head block, for the spindle and perpendicular shaft to work upon. The front cross piece to be divided into equal spaces of three or four inches each, every other one of which is to receive a piece [illegible] it, and to project as far forward as the side pieces, making each twenty two inches in length [illegible] [illegible] from the [illegible] [illegible] [illegible] [illegible] [illegible] [illegible] the [illegible] [illegible] [illegible] [illegible]

7724X

[illegible] over the edges of the bottom ones and likewise to be
eighteen inches in length corresponding with the bottom ones
but reduced to a point presenting the shape of a spear, a rivet
hole to be made in it to suit the bottom one by which they
are to be fastened together in a manner to suffer them to play back
-wards and forwards, like a common pair of shears so that
when the one side is shut the other stands open to receive the
grain presenting a shape or force of an acute angle, the edges
of the top blades to be made similar to those of a common pair of
shears the handles, of all the top blades, are to continue back,
in rear of the cross piece from one to two feet, two of which are to be
continued so far back, as to pass the perpendicular shaft, a proper
distance having their ends connected together by a cross piece so
as to permit them to play freely when in motion. the arms
or handles of each to be made proportionally strong the
shorter ones are likewise to be connected to the longer, so that
when motion is given to the longer the whole move regularly
together. The reel is to be made of suitable materials of
the following dimensions, to be as wide as the space between
the uprights upon which it revolves, with four arms tenoned
in each end of the shaft at equal distances apart, each
arm to be from two to four feet in length, at the end of
each arm a segment corresponding with the circle which
the reel will describe with the arms in it, is to be fastened
from eighteen to twenty four inches in curve length from
one segment to the opposite one, this is to be put on a sui-
-table piece of board or otherwise fitting the curve or
arch of each, and likewise on each segment, thus forming
the reel, which in its shape, represents a cylinder or
drum with four open spaces and four surfaces, which
may be increased to a greater number, or reduced to a less,
as the case may require the spaces are to [illegible] the
grain into the reel, and the lower edge of the [illegible]

or horses. The space between the first and second cross pieces is
to be occupied by the revolving plain or sheet. The space between
the second and third cross piece to be occupied by the wheels
which are to carry the machine, and to give motion to the whole
The space behind the wheels, for purposes as the case may require
Immediately or upon a line with the first cross piece, a perpendic-
-ular is to be raised on each side of the frame from two to
four feet in height, of proper strength with braces to keep them
permanent, which are intended to give bearings to the gudgeons
of the reel shaft, In rear of the space for the revolving plain or sheet
a guard board, is to be raised, to give proper direction to the grain
and to be of proper height. In the centre of the space, in which the
wheels move, two uprights are to be raised, one on each side of the
frame of proper heights and connected together, by a cap or head
block, through which the perpendicular shaft is to pass, the
upright to be raised to give strength and support to the frame
- The shears are to be made of suitable materials, of the following
shape and dimensions, the bottom plates are to be made with
two blades running out eighteen inches in length, clear of the
rivet plate, to which they are connected and which is to be made
of a proper breadth to suit the cross piece to which they are fas-
tened, the blades that run out, are to be set so far apart as
to have a space of three or four inches between them, more or
less to suit or correspond with the spaces which are to receive
the grain, The inner edges of each blade or bottom plates to
be made similar to that of a common pair of shears, and of
proper breadth, to receive bolt holes, by which they are to be
fastened to the projecting pieces, which are to be brought to a
point in front of the plates, for the purpose of dividing the grain
and passing the machine into it freely, The top blade or other
part, which forms the [illegible] shear is to be made wide
enough behind so at the heel to project the edge [illegible]

[illegible]

to catch it and give it the proper inclination over a roller
which is set upon two springs, fastened by a screwbolt at each
side of the frame and inside of the upright the roller is to be
made of suitable material and diameter its length to corre-
spond with the width of the reel, the springs which support
it of proper strength, to cause it to revolve when its surface comes
in contact with the surfaces, of the reel, by which means the
grain, is to be rolled upon the revolving plane or sheet immedia-
tely behind it; The springs are used to cause the space between
the surface of the roller, and the surfaces of the reel to in-
crease or diminish as the quantity of the grain passing through
becomes greater or less. The revolving plane or sheet is to be made
of suitable material of the following length and breadth.
the length to suit the space intervening between the
upright and the roller and the guard board, raised upon
the second cross piece its breadth to correspond with that of
the machine, Including two rollers around which it is to
revolve, one end of each roller to have its bearing in
the guard board, and the other end of each in the perpendi-
culars. or uprights, sufficiently high enough to suffer the plane
or sheet to revolve without interruption from the handles or arms
of shears below. The perpendicular or shaft is to be made
of suitable material and of suitable height it is to be
placed in the space between the second and third supporters
having its bearings upon the head block, below, and the cap
above upon it; next to the head block, it has a cog wheel,
high up, it has an arm of proper length and [illegible]
immediately above the cap it has a segment of a wheel of
proper material, from the foregoing cap to the [illegible]
a horizontal shaft [illegible] of suitable length [illegible]
and at right angles with the perpendicular [illegible]
it [illegible]
it [illegible]

77244 rollers which have been already described must have a pulley on
the end next to the guard board and to stand directly opposite
to the band wheel or pulley on the horizontal shaft. This machine
is to be propelled by a horse or horses, hitched to a pair of shafts
which are to be attached to the side of the same, the wheels
are to be made of suitable materials and proper height, having
each a separate spindle or shaft permanently fixed in their
centres, so that when the wheels revolve or turn the spindles,
or shafts are made to do so likewise, the bearing of each to
rest upon the side frames, and center cross piece or head block of
the perpendicular shaft on the end of one of the spindles, or
shaft next to the centre head block, there is a cog wheel of
proper size, and shape interlocking the one on the perpendicular
shaft giving motion to it - the arm thereupon strikes the
arms or handles of the shears giving motion to them, the segment above
the cap, on the same shaft interlocks the spur wheel, on
the horizontal shaft at every round or revolution giving motion
to that a strap or chain, or otherwise connects the pulley at
the other end with the pulley on the end of the roller, gives
motion to the revolving sheet or plane at intervals, the reel
receives its motion from the same ground wheel by means of
a strap and pulley or chain or line of shaft as the case may
require, the motion of the reel, gives motion to the roller,
then by the movement of the horse or horses, the whole is put
into regular motion. The principle or mode of its operation
are as follows. The projectors divide the grain as the machine
advances, and directs it into the space, or opening made by
the shears, being shut on the one side, and assists in confining
the grain in a proper position to be cut by the shears. after
receiving the grain and [illegible] to the [illegible] being [illegible], [illegible]
[illegible] in its perpendicular position, the [illegible] by [illegible]
[illegible] and [illegible]
[illegible]

[illegible]

moment the shears make a cut [illegible] upon a space on the opposite side for the same purpose as before, the grain is then rolled in [illegible] by the roller and the surface in the reel which can be made to compress it so tight as to prevent a boy from retaining it in the hand (if he were to catch hold of it) by the strength of the springs which the roller moves upon, to the revolving plane, or sheet, rake, or scraper, or the receiver, behind the roller, when the surface of the reel leaves the surface of the roller, the grain falls upon the receiver and remains in that position until two or more cuts are made, then it is made to pass off at right angles with the direction it came upon the receiver by the revolving plane, or sheet, or rake, or scraper, and deposited on the ground by the side of the Machine in [illegible] or [illegible] —

We therefore claim the right of the invention of the reel, of open spaces, and solid surfaces —— The double [illegible] The roller settling on springs – The revolving plane, or sheet or scraper – The projectors or dividers of the grain as above described and intended to be used for the purpose of cutting all kinds of grain seeds, & grass)

Witnesses
Thomas [illegible]
C. Schnebly

William Schnebly
Thomas Schnebly

[illegible]

[illegible]